US012577022B2

(12) United States Patent　　(10) Patent No.:　US 12,577,022 B2

Okamoto et al.　　(45) Date of Patent:　Mar. 17, 2026

(54) PACKAGING BAG

(71) Applicant: ZACROS Corporation, Tokyo (JP)

(72) Inventors: Hajime Okamoto, Tokyo (JP); Atsushi Mio, Tokyo (JP); Junpei Nomura, Tokyo (JP); Toyoaki Suzuki, Tokyo (JP)

(73) Assignee: ZACROS CORPORATION, Tokyo (JP)

( * ) Notice: Subject to any disclaimer, the term of this patent is extended or adjusted under 35 U.S.C. 154(b) by 84 days.

(21) Appl. No.: 16/607,719

(22) PCT Filed: Apr. 10, 2018

(86) PCT No.: PCT/IB2018/000346

§ 371 (c)(1),
(2) Date: Oct. 24, 2019

(87) PCT Pub. No.: WO2018/203123

PCT Pub. Date: Nov. 8, 2018

(65) Prior Publication Data

US 2020/0130909 A1　　Apr. 30, 2020

(30) Foreign Application Priority Data

May 1, 2017　　(JP) ................................. 2017-091287

(51) Int. Cl.
B65D 65/40　　(2006.01)
B32B 27/08　　(2006.01)
(Continued)

(52) U.S. Cl.
CPC .............. B65D 65/40 (2013.01); B32B 27/08 (2013.01); B32B 27/32 (2013.01); B32B 27/36 (2013.01);
(Continued)

(58) Field of Classification Search
CPC ......... B32B 1/02; B32B 27/32; B32B 27/322; B32B 27/38; B32B 27/36;
(Continued)

(56) References Cited

U.S. PATENT DOCUMENTS 5,346,963 A * 9/1994 Hughes ................. C08F 255/02
　　　　　　　　　　　　　　　　525/285
5,693,728 A * 12/1997 Okamoto ............ C08L 23/0815
　　　　　　　　　　　　　　　　526/115
(Continued)

FOREIGN PATENT DOCUMENTS

JP　　　H9-151290 A　　6/1997
JP　　　H11-060757 A　　3/1999
(Continued)

OTHER PUBLICATIONS

Thw Free Dictionary, 2003-2025.*

(Continued)

*Primary Examiner* — Michael C Miggins

(74) *Attorney, Agent, or Firm* — XSENSUS LLP

(57) ABSTRACT

A packaging bag has a bag body and an outlet joined to the bag body, in which the bag body includes, as a forming material, laminates each having at least a substrate layer, a first intermediate layer, and a sealant layer in this order, and has a bag shape formed by sticking the sealant layers to each other, the sealant layers being disposed opposite each other to define an internal side, the outlet is joined by being held between the opposite sealant layers, the first intermediate layer contains a polyethylene-based resin and a modified polyethylene-based resin, and the substrate layer includes a layer containing a fluorine-based resin as a forming material.

10 Claims, 2 Drawing Sheets

(51) Int. Cl.
 *B32B 27/32*  (2006.01)
 *B32B 27/36*  (2006.01)
 *B65D 75/58*  (2006.01)

(52) U.S. Cl.
 CPC ...... *B65D 75/5883* (2013.01); *B32B 2250/05* (2013.01); *B32B 2250/24* (2013.01); *B32B 2439/46* (2013.01)

(58) Field of Classification Search
 CPC ....... Y10T 428/1352; Y10T 428/31511; Y10T 428/31909; B65D 25/14
 USPC .......... 428/35.9, 35.7, 413, 516; 220/62.22; 383/105
 See application file for complete search history.

(56) References Cited

U.S. PATENT DOCUMENTS

| | | | | |
|---|---|---|---|---|
| 5,863,977 | A * | 1/1999 | Fischer | C09J 153/025 |
| | | | | 524/505 |
| 6,797,787 | B2 * | 9/2004 | Scholz | C08C 19/06 |
| | | | | 525/386 |
| 8,399,078 | B2 | 3/2013 | Madsen et al. | |
| 2003/0017328 | A1 | 1/2003 | Inoue et al. | |
| 2004/0023022 | A1 | 2/2004 | Inoue et al. | |
| 2004/0197567 | A1 | 10/2004 | Tsai et al. | |
| 2004/0214127 | A1 * | 10/2004 | Kubo | A61K 6/887 |
| | | | | 433/199.1 |
| 2004/0247837 | A1 * | 12/2004 | Enlow | B32B 27/30 |
| | | | | 428/195.1 |
| 2005/0186379 | A1 | 8/2005 | Rhee et al. | |
| 2007/0141326 | A1 * | 6/2007 | Declerck | B32B 37/153 |
| | | | | 156/244.27 |
| 2007/0260016 | A1 * | 11/2007 | Best | B32B 27/32 |
| | | | | 525/240 |
| 2009/0208685 | A1 * | 8/2009 | Rivers | B32B 15/08 |
| | | | | 428/512 |
| 2009/0230132 | A1 * | 9/2009 | Takedutsumi | B65D 77/06 |
| | | | | 220/495.06 |
| 2012/0145710 | A1 * | 6/2012 | Corbett | B65D 25/48 |
| | | | | 220/9.4 |
| 2015/0348820 | A1 | 12/2015 | Taya et al. | |
| 2016/0039178 | A1 | 2/2016 | Bensason et al. | |
| 2017/0088324 | A1 | 3/2017 | Sasaki et al. | |
| 2018/0105332 | A1 * | 4/2018 | Ohkubo | B65D 85/72 |
| 2019/0001634 | A1 | 1/2019 | Takei et al. | |

FOREIGN PATENT DOCUMENTS

| | | | | |
|---|---|---|---|---|
| JP | 2000-084044 | A | | 3/2000 |
| JP | 2001240083 | A | * | 9/2001 |
| JP | 2002-283512 | A | | 10/2002 |
| JP | 2004315067 | A | | 11/2004 |
| JP | 2005-335134 | A | | 12/2005 |
| JP | 2006-168003 | A | | 6/2006 |
| JP | 2007-506464 | A | | 3/2007 |
| JP | 2007253961 | A | * | 10/2007 |
| JP | 2009-013285 | A | | 1/2009 |
| JP | 2009-040439 | A | | 2/2009 |
| JP | 2010-075683 | A | | 4/2010 |
| JP | 2010221521 | A | * | 10/2010 |
| JP | 2013091702 | A | | 5/2013 |
| JP | 2014057723 | A | | 4/2014 |
| JP | 2015013683 | A | | 1/2015 |
| JP | 2016093894 | A | | 5/2016 |
| JP | 2016-525464 | A | | 8/2016 |
| JP | 2017036354 | A | | 2/2017 |
| JP | 2017-043693 | A | | 3/2017 |
| WO | 2014/103468 | A1 | | 7/2014 |
| WO | 2015/141225 | A1 | | 9/2015 |
| WO | 2016/013595 | A1 | | 1/2016 |

OTHER PUBLICATIONS

International Preliminary Report on Patentability dated Nov. 5, 2019 for PCT/IB2018/000346 and English translation thereof; 20 pgs.

International Search Report dated Jun. 26, 2018 for PCT/IB2018/000346 and English translation thereof; 5 pgs.

Office Action in Corresponding Singapore Patent Application No. 11201909666U dated Nov. 4, 2020, 7 pgs.

Extended European Search Report in Corresponding European Patent Application No. 18794838.5 dated Nov. 25, 2020, 9 pgs.

Office Action in Corresponding Korean Patent Application No. 10-2019-7030947 dated Dec. 14, 2020 and English translation, 17 pgs.

Office Action in Chinese Patent Application No. 201880027243.0 dated Apr. 1, 2021, 11 pgs.

Office Action in Korean Patent Application No. 10-2019-7030947 dated Apr. 9, 2021, 10 pgs.

Notice of Allowance in Korean Patent Application No. 10-2019-7030947 dated Jun. 1, 2021, 4 pgs.

Office Action in Japanese Patent Application No. 2017-091287 dated Jun. 8, 2021, 12 pgs.

Office Action in Korean Patent Application No. 10-2021-7014115 dated Jun. 18, 2021, 15 pgs.

Office Action in corresponding Chinese Patent Application No. 201880027243.0 dated Nov. 3, 2021; 13 pgs.

Notice of Allowance in corresponding Korean Patent Application No. 10-2021-7014115 dated Dec. 9, 2021; 4 pgs.

Notice of Allowance for Chinese Patent Application No. 201880027243.0 dated Feb. 28, 2022; 6 pgs.

Notice of Allowance for Japanese Patent Application No. 2017-091287 dated Mar. 8, 2022; 5 pgs.

Notice of Allowance for Singapore Patent Application No. 11201909666U dated Mar. 22, 2022; 6 pgs.

Office Action for European Patent Application No. 18794838.5 dated Mar. 31, 2022; 5 pgs.

Notice of Allowance in corresponding Japanese Patent Application No. 2022-076445, dated Nov. 8, 2022; 5 pgs.

Office Action for European Patent Application No. 18794838.5 dated May 8, 2024; 5pp.

Office Action for Japanese Patent Application No. 2023-001711 dated Mar. 19, 2024; 6pp.

Notice of Allowance for Japanese Patent Application No. 2023-001711 dated Aug. 20, 2024; 5pp.

Office Action for Canadian Patent Application No. 3,061,571 dated Jun. 25, 2024; 3pp.

Decision to Grant a Patent for Japanese Patent Application No. 2024-182600 dated Aug. 5, 2025 and English translation thereof, total 5 pages.

* cited by examiner

PACKAGING BAG

CROSS REFERENCE TO RELATED APPLICATIONS

This application is a National Phase of PCT/IB2018/000346 filed on Apr. 10, 2018, which, in turn, claimed the priority of Japanese Patent Application No. 2017-091287 which was filed on May 1, 2017.

TECHNICAL FIELD

The present invention relates to a packaging bag.

BACKGROUND TECHNOLOGY

A resin film used as a packaging material for medicines, cosmetics, foods, and the like is required to have a low water vapor permeability, in order to suppress deterioration of active ingredients of these contents. Particularly, as a packaging material for products to be applied to a living body, such as medicines, a packaging bag including a sealant resin such as polyolefin is used (for example, Patent Document 1). The packaging bag including a sealant resin such as polyolefin can suppress a water vapor permeability to be low, due to the hydrophobicity of the polyolefin.

DOCUMENTS OF RELATED ART

Patent Documents

Patent Document 1: Japanese Unexamined Patent Application, First Publication No. 2000-084044

SUMMARY OF THE INVENTION

Problem to be Solved by the Invention

However, there is a possibility that the packaging bag including a sealant resin such as polyolefin adsorbs medicines or the like with a sealant resin layer, and denatures ingredients such as proteins contained in a biological material. This is presumed to be due to that polyolefin having hydrophobicity has high lipophilicity at the same time. Then, a packaging bag that hardly adsorbs medicines or the like has been demanded.

Furthermore, the packaging bag as described in Patent Document 1 has been required to further reduce a water vapor permeability in response to the demand of the market.

The present invention has been made in view of such circumstances, and provides a novel packaging bag that has a low water vapor permeability and is excellent in non-adsorbability.

Means for Solving the Problem

In order to solve the above-mentioned problem, one aspect of the present invention provides a packaging bag comprising: a bag body and an outlet joined to the bag body, wherein the bag body includes, as a forming material, laminates each having at least a substrate layer, a first intermediate layer, and a sealant layer in this order, and has a bag shape formed by sticking the sealant layers to each other, the sealant layers being disposed opposite each other to define an internal side, the outlet is joined by being held between the opposite sealant layers, the first intermediate layer contains a polyethylene-based resin and a modified polyethylene-based resin, and the substrate layer includes a layer containing a fluorine-based resin as a forming material.

One aspect of the present invention may have a configuration in which the polyethylene-based resin is linear low-density polyethylene.

One aspect of the present invention may have a configuration in which the modified polyethylene-based resin is maleic anhydride-modified polyethylene.

One aspect of the present invention provides a packaging bag comprising: a bag body and an outlet joined to the bag body, wherein the bag body includes, as a forming material, laminates each having at least a substrate layer, a first intermediate layer, and a sealant layer in this order, and has a bag shape formed by sticking the sealant layers to each other, the sealant layers being disposed opposite each other to define an internal side, the outlet is joined by being held between the opposite sealant layers, the first intermediate layer contains a polyethylene-based resin, an elastomer component, and a component having an epoxy group, and the substrate layer includes a layer containing a fluorine-based resin as a forming material.

One aspect of the present invention may have a configuration in which the component having an epoxy group is a component in which epoxy has been partially introduced into 1,2-polybutadiene and has a number average molecular weight of 500 or more and 4,000 or less.

One aspect of the present invention may have a configuration in which the elastomer component contains a styrene-ethylene-butylene-styrene copolymer having a styrene content of 8% by mass or more and 24% by mass or less.

One aspect of the present invention may have a configuration in which a thickness of the layer containing a fluorine-based resin as a forming material is 20 μm or more and 60 μm or less.

One aspect of the present invention may have a configuration in which the fluorine-based resin is polychlorotrifluoroethylene.

One aspect of the present invention may have a configuration in which the sealant layer contains a cyclic olefin-based resin.

One aspect of the present invention may have a configuration in which the bag body comprises a surface resin layer and a second intermediate layer held between the substrate layer and the surface resin layer, on a surface on an external side of the substrate layer.

One aspect of the present invention may have a configuration in which the outlet contains a cyclic olefin-based resin as a forming material.

One aspect of the present invention may have a configuration in which the outlet is a two-colored molded article, and at least a part contacting a content contains a cyclic olefin-based resin.

Effects of Invention

The present invention provides a novel packaging bag that has a low water vapor permeability and is excellent in non-adsorbability.

BEST MODE FOR CARRYING OUT THE INVENTION

First Embodiment

<Packaging Bag>

A packaging bag according to a first embodiment of the present invention will be described below with reference to FIG. 1 and FIG. 2. In addition, in these figures, a dimension, ratio, and the like of each element are appropriately made to be different from actual ones, so as to make each element have such a size that it can be recognized on the figures.

The packaging bag according to the present embodiment is a packaging bag accommodating a content such as medicines, cells, tissues, organs, biological materials, bloods, body fluids, enzymes, antibodies, beauty products, nutrients, health agents, cosmetics or foods. The packaging bag according to the present embodiment is preferably used as a packaging bag accommodating medicines. Examples of a form of the packaging bag include a three-way bag, a four-way bag, a butt-seamed bag, a gusset bag, a self-standing bag, a pouch, large-sized bags such as an inner bag for bag-in-box and a drum interior bag, and the like.

A specific state, shape, and the like of the content accommodated in the packaging bag of the present embodiment are not particularly limited. The above-mentioned content may be, for example, a solid, a liquid, a gas, powder, a particle, a mixture, a composition, a dispersion or the like. Furthermore, when the content is a liquid, the liquid may be an aqueous solution containing a drug. When the content is accommodated in the packaging bag, the packaging bag may be filled with an inert gas such as nitrogen or a liquid.

Figure 1:
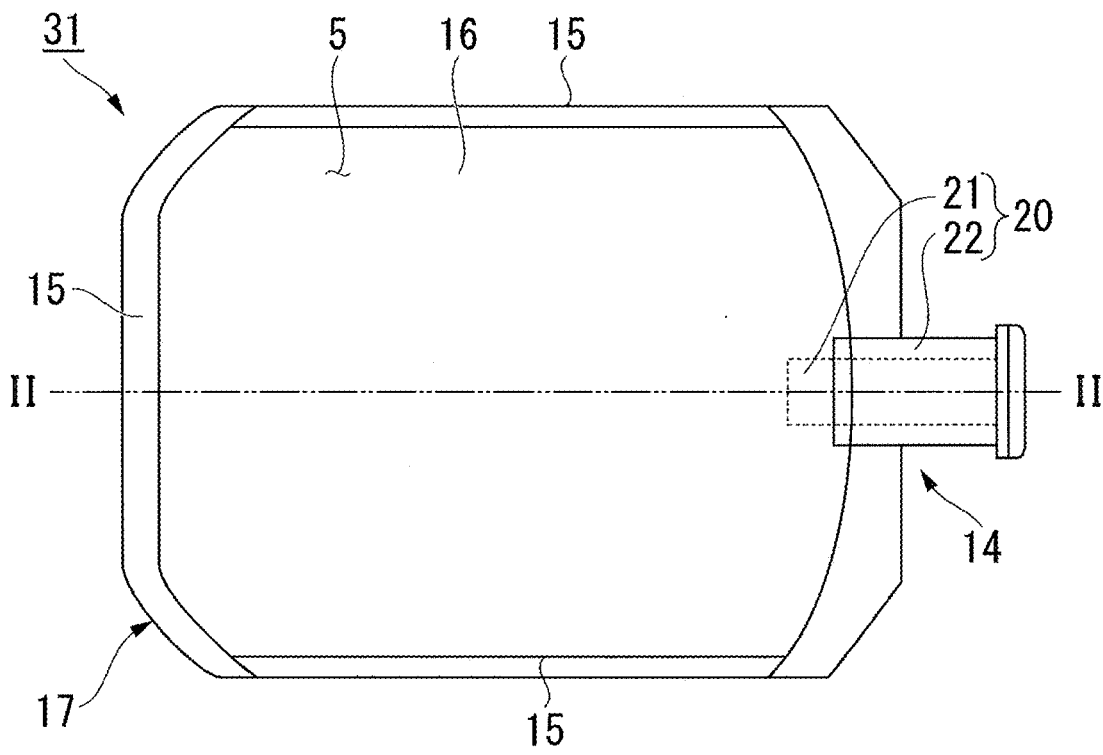
FIG. 1 is a plan view of a packaging bag 31 according to a first embodiment of the present invention.
Figure 2:
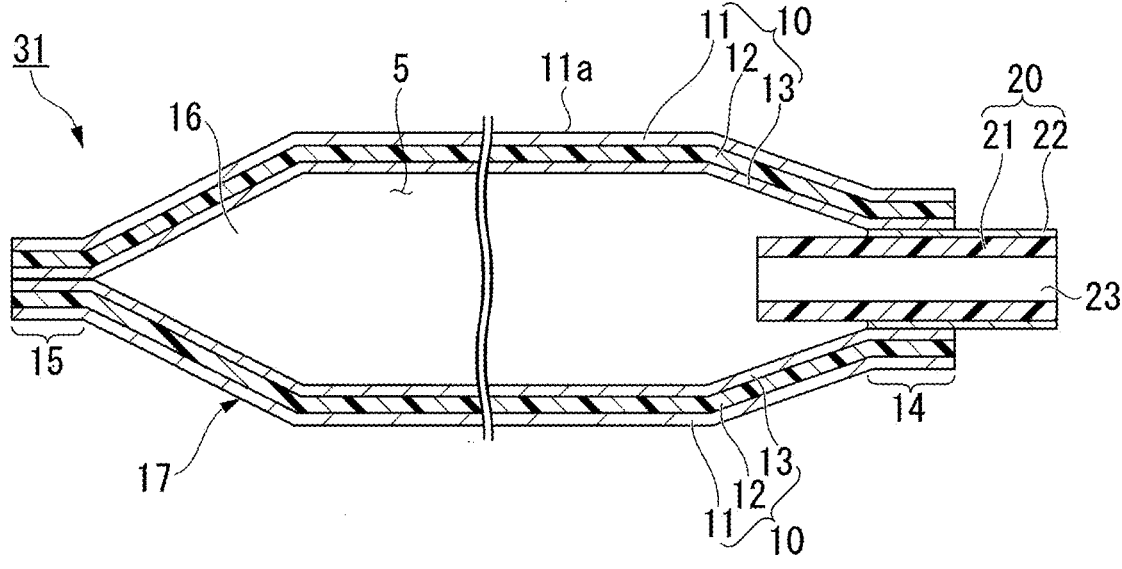
FIG. 2 is a cross-sectional view along II-II line of FIG. 1.

FIG. 1 is a plan view of a packaging bag 31 according to the first embodiment. FIG. 2 is a cross-sectional view along II-II line of FIG. 1. As shown in FIG. 1 and FIG. 2, the packaging bag 31 has a bag body 17 and an outlet 20 joined to the bag body 17.

The bag body 17 includes laminates 10 as a forming material and is molded into a bag shape by sticking two laminates 10 to each other. The outlet 20 is joined by being held between the opposite laminates 10.

The packaging bag 31 has a first joining part 14 at which the laminate 10 and the outlet 20 are joined and a second joining part 15 at which the laminates 10 are joined to each other. In a plan view, the first joining part 14 and the second joining part are continuous, and are provided in a closed ring shape at the periphery portion of the bag body 17. Furthermore, in the packaging bag 31, a part of the first joining part 14 and a part of the second joining part 15 may have a folded part in which the laminate 10 is mountain-folded into a V-shaped cross section.

The bag body 17 has a space 5 for filling a content 16. In addition, in the figures, a specific state, shape, and the like of the content 16 are not shown. Before filling the content 16, the bag body 17 may have a filling port for filling the content 16 into the space 5.

[Laminate]

The laminate 10 has a substrate layer 11, a first intermediate layer 12, and a sealant layer 13 in this order. The bag body 17 shown in FIG. 2 is such that two laminates 10 are used, the sealant layers 13 of the laminates are disposed opposite each other, and the sealant layers 13 are stuck to each other.

(Substrate Layer)

In the first embodiment, the substrate layer 11 is a layer exposed on an external side of the space 5. The substrate layer 11 of the present embodiment includes a layer containing a fluorine-based resin as a forming material. When the substrate layer 11 includes the layer containing a fluorine-based resin as a forming material, a packaging bag that is excellent in mechanical strength and optical properties, and has a low water vapor permeability can be provided.

Examples of the fluorine-based resin include polytetrafluoroethylene (PTFE), a tetrafluoroethylene-perfluoroalkyl vinyl ether copolymer (PFA), a tetrafluoroethylene-hexafluoropropylene copolymer (FEP), tetrafluoroethylene-hexafluoropropylene-perfluoroalkyl vinyl ether (EPA), a tetrafluoroethylene-ethylene copolymer (ETFE), polyvinylidene fluoride (PVDF), polychlorotrifluoroethylene (PCTFE), a chlorotrifluoroethylene-ethylene copolymer (ECTFE), and the like. Inter alia, polychlorotrifluoroethylene (PCTFE) is preferable. The above-mentioned resins may be used alone, or two or more kinds thereof may be used jointly.

When two laminates 10 are heat-sealed with the sealant layers 13, it is necessary to heat the sealant layers 13 until a resin contained in the sealant layers 13 is melted. At that time, in order to suppress the deformation and deterioration of the laminates 10, it is necessary that a heating temperature at the time of heat sealing is lower than the melting temperature of a resin contained in the substrate layers 11. For that reason, the kind of the resin contained in the sealant layers 13 is limited by the kind of the resin contained in the substrate layers 11.

In the laminate 10 of the present embodiment, by including a fluorine-based resin having a high glass transition temperature as compared with that of a resin that has been so far applied to the substrate layer, an option of a material forming the sealant layer 13 can be widened.

In the present embodiment, a thickness of the layer containing a fluorine-based resin as a forming material is preferably 20 μm or more and 60 μm or less. When the thickness of the layer containing a fluorine-based resin as a forming material is 20 μm or more, the water vapor permeability of the packaging bag 31 can be sufficiently lowered. Furthermore, when the thickness of the layer containing a fluorine-based resin as a forming material is 60 μm or less, the production cost can be reduced.

The substrate layer 11 may have a monolayer configuration of one layer, or may have a laminate configuration of two or more layers. A layer that may constitute the substrate layer 11 (hereinafter, referred to as "another layer") can be appropriately selected. Examples of the other layer include a reinforcing layer, a gas barrier layer, a light shielding layer, a printing layer, a metal foil, synthetic paper, and the like. The other layer can have a configuration not containing a fluorine-based resin.

Examples of the reinforcing layer include reinforcing resin layers such as biaxially stretched polyethylene terephthalate (O-PET), biaxially stretched nylon (O-Ny), and biaxially stretched polypropylene (OPP).

The gas barrier layer can be constituted from, for example, an inorganic material, a gas barrier resin or the like. Examples of the inorganic material include a metal-deposited layer and a metal oxide such as alumina.

Examples of the gas barrier resin include an ethylene-vinyl alcohol copolymer (EVOH), vinylidene chloride, and the like.

The laminate 10 may have a printing layer or a coating layer on a surface 11a of the substrate layer 11 opposite to the first intermediate layer 12.

The printing layer can impart discriminability or designability to the packaging bag 31 by printing ink on a surface (surface 11a) of the substrate layer 11.

The coating layer is a layer for protecting the substrate layer 11 or the other layer such as a printing layer provided on the substrate layer 11. Examples of such a coating layer include a resin layer of a thin film (resin film), an ultraviolet-curing type resin layer, and the like.

(First Intermediate Layer)

The first intermediate layer 12 bonds the substrate layer 11 and the sealant layer 13. It is preferable that the first intermediate layer 12 of the present embodiment either contains a polyethylene-based resin and a modified polyethylene-based resin, or contains a polyethylene-based resin, an elastomer component, and a resin composition containing an epoxy group.

In the present specification, the first intermediate layer containing a polyethylene-based resin and a modified polyethylene-based resin may be referred to as "intermediate layer (1)". Furthermore, the first intermediate layer containing a polyethylene-based resin, an elastomer component, and a resin composition containing an epoxy group may be referred to as "intermediate layer (2)".

Intermediate Layer (1)

Examples of the polyethylene-based resin contained in the intermediate layer (1) include linear low-density polyethylene (LLDPE), low-density polyethylene (LDPE), medium-density polyethylene (MDPE), and high-density polyethylene (HDPE), and it is preferable that the polyethylene-based resin is linear low-density polyethylene.

The modified polyethylene-based resin contained in the intermediate layer (1) is a polyethylene-based resin modified with unsaturated carboxylic acid or a derivative thereof, and has an acid functional group such as a carboxy group or a carboxylic anhydride group in the polyethylene-based resin. In the present embodiment, one obtained by acid-modifying a polyethylene-based resin is preferable.

Examples of the acid-modifying method include graft modification in which a polyethylene-based resin and an acid functional group-containing monomer are melted and kneaded in the presence of a radical polymerization initiator such as an organic peroxide or an aliphatic azo compound.

A polyethylene-based resin material before modification is not limited as long as the material contains ethylene as a raw material monomer, and a known polyethylene-based resin is appropriately used. Specifically, examples of the polyethylene-based resin include ethylene-α-olefin copolymers such as an ethylene-propylene copolymer, an ethylene-1-butene copolymer, an ethylene-4-methyl-1-pentene copolymer, an ethylene-1-hexene copolymer, and an ethylene-1-octene copolymer; ethylene-based copolymer resins such as an ethylene-vinyl acetate copolymer, an ethylene-(meth)acrylic acid copolymer, and an ethylene-(meth)acrylic acid ester copolymer; and the like, in addition to the above-mentioned examples.

The acid functional group-containing monomer is a compound having an ethylenic double bond and a carboxy group or a carboxylic anhydride group in the same molecule, and examples thereof include various unsaturated monocarboxylic acids and dicarboxylic acids, or acid anhydrides of dicarboxylic acids.

Examples of the acid functional group-containing monomer having a carboxy group (carboxy group-containing monomer) include α,β-unsaturated carboxylic acid monomers such as acrylic acid, methacrylic acid, maleic acid, nadic acid, fumaric acid, itaconic acid, citraconic acid, crotonic acid, isocrotonic acid, tetrahydrophthalic acid, and endo-bicyclo [2.2.1]-5-heptene-2,3-dicarboxylic acid (endic acid).

Examples of the acid functional group-containing monomer having a carboxylic anhydride group (carboxylic anhydride group-containing monomer) include unsaturated dicarboxylic acid anhydride monomers such as maleic anhydride, nadic anhydride, itaconic anhydride, citraconic anhydride, and endic anhydride.

These acid functional group-containing monomers may be used alone, or two or more kinds thereof may be used jointly in components constituting the first intermediate layer 12.

Inter alia, as the acid functional group-containing monomer, an acid functional group-containing monomer having an acid anhydride group is preferable, a carboxylic anhydride group-containing monomer is more preferable, and maleic anhydride is particularly preferable.

When a part of the acid functional group-containing monomer used for acid modification is unreacted, it is preferable to use one from which an unreacted acid functional group-containing monomer has been removed in advance in order to prevent reduction in an adhesive force due to the unreacted acid functional group-containing monomer.

It is preferable that the modified polyethylene-based resin contained in the intermediate layer (1) is maleic anhydride-modified polyethylene.

In the intermediate layer (1), when a total mass of the polyethylene-based resin and the modified polyethylene-based resin is set to 100%, a lower limit value of a proportion of the polyethylene-based resin to the total mass of the polyethylene-based resin and the modified polyethylene-based resin is preferably 10% or more, and further preferably 20% or more. Furthermore, an upper limit value of the proportion of the polyethylene-based resin to the total mass of the polyethylene-based resin and the modified polyethylene-based resin is preferably 70% or less, and further preferably 60% or less. For example, a mixing ratio of the polyethylene-based resin and the modified polyethylene-based resin can take [polyethylene-based resin]:[modified polyethylene-based resin]=20:80 to 60:40.

In the present embodiment, by using a mixed material of the polyethylene-based resin and the modified polyethylene-based resin in the first intermediate layer 12, the adhesion between the sealant layer 13 and the substrate layer 11 can be improved. For that reason, a laminate 10 that hardly causes interlayer peeling can be provided.

Intermediate Layer (2)

The intermediate layer (2) contains a resin composition containing a polyethylene-based resin, an elastomer component, and a component having an epoxy group.

The polyethylene-based resin contained in the intermediate layer (2) may be the same as the polyethylene-based resin contained in the above-mentioned intermediate layer (1), and may be a biomass-derived polyethylene-based resin, a petroleum-derived polyethylene-based resin or a mixture thereof.

The polyethylene-based resin contained in the intermediate layer (2) is preferably a polyethylene-based resin polymerized with a metallocene-based catalyst. Inter alia, preferable examples thereof include an ethylene-α olefin copolymer such as C4-LLDPE, C6-LLDPE, and C8-LL-DPE, which is polymerized with a metallocene-based catalyst, long chain branched polyethylene, and the like.

The polyethylene-based resin polymerized with a metallocene-based catalyst has a tendency of narrow molecular weight distribution. For that reason, the content amount of a low molecular weight component that can be an adhesion inhibiting factor is low, and it is considered that high adhesiveness is obtained when such a polyethylene-based resin is used as an adhesive agent.

A density of the polyethylene-based resin in the above-mentioned resin composition is preferably 0.890 g/cm³ or more and 0.940 g/cm³ or less, and more preferably 0.910 g/cm³ or more and 0.930 g/cm³ or less.

A content amount of the polyethylene-based resin in the above-mentioned resin composition is 55 parts by mass or more and 90 parts by mass or less, and preferably 60 parts by mass or more and 80 parts by mass or less.

By adjusting the content amount of the polyethylene-based resin to the above-mentioned upper limit value or less, the pressure-sensitive adhesiveness with an elastomer component described later is exerted and the adhesiveness is increased.

Examples of the elastomer component contained in the intermediate layer (2) include a styrene-based elastomer, an acrylic-based elastomer, a urethane-based elastomer, an ester-based elastomer, and the like. However, as the elastomer component, a component having an epoxy group described later is excluded.

Inter alia, a styrene-based elastomer is preferable, and examples thereof include a block copolymer having a hard segment including polystyrene or the like and a soft segment including polyethylene, polybutadiene, polyisoprene or the like. Examples of a styrene-based polymer usable in the styrene-based elastomer include copolymers of aromatic olefin-aliphatic olefin such as a styrene-butadiene copolymer, a styrene-isoprene copolymer, and a styrene-ethylene copolymer.

It is preferable that the styrene-based elastomer is a styrene-ethylene-butylene-styrene copolymer (SEBS) in which unsaturated bonds in molecular chains of a styrene-butylene-styrene copolymer (SBS) have completely been hydrogenated.

Furthermore, a styrene content thereof is preferably 8% by mass or more and 24% by mass or less, and more preferably 10% by mass or more and 20% by mass or less.

By adjusting the styrene content to the above-mentioned upper limit value or less, curing of the resin is suppressed and reduction in adhesiveness can be suppressed.

Specific examples of the elastomer component contained in the intermediate layer (2) include DYNARON from JSR Corporation, TUFTEC H Series from Asahi Kasei Chemicals Corporation, Kraton G polymer from KRATON CORPORATION, and the like.

In the intermediate layer (2), a content amount of the elastomer component is 10 parts by mass or more and 45 parts by mass or less, and preferably 20 parts by mass or more and 40 parts by mass or less.

By adjusting the content amount of the elastomer component to the above-mentioned upper limit value or less, reduction in tensile strength when an adhesive agent layer is formed is suppressed and reduction in adhesive strength can be prevented.

In addition, a total of the above-mentioned polyethylene-based resin and the above-mentioned elastomer component in the intermediate layer (2) is set to 100 parts by mass.

The component having an epoxy group and contained in the intermediate layer (2) is preferably a component having an epoxy group and a vinyl group. The component having an epoxy group and a vinyl group is preferably a component having a 1,2-vinyl structure, and is preferably epoxidized polybutadiene in which butadiene has been partially epoxidized. Epoxidized polybutadiene in which 1,2-polybutadiene has been partially epoxidized is particularly preferable.

Specific examples of the component having an epoxy group include liquid polybutadiene JP-100 and JP-200 from NIPPON SODA CO., LTD., Adekacizer BF-1000 from ADEKA CORPORATION, and the like.

It is preferable that a number average molecular weight of the component having an epoxy group is 500 or more and 4,000 or less.

By adjusting the number average molecular weight of the component having an epoxy group to the above-mentioned upper limit value or less, reduction in pressure-sensitive adhesiveness due to becoming the solid state at an ambient temperature is suppressed, and reduction in adhesiveness can be prevented.

A number average molecular weight in the present embodiment is a value in terms of polystyrene, which is measured by gel permeation chromatography (GPC).

In the intermediate layer (2), a content amount of the component having an epoxy group relative to the total amount of 100 parts by mass of the above-mentioned polyethylene-based resin and the above-mentioned elastomer component is 0.1 parts by mass or more and 1.5 parts by mass or less, and preferably 0.5 parts by mass or more and 1.0 part by mass or less.

By adjusting the content amount of the component having an epoxy group to the above-mentioned upper limit value or less, a low-molecular weight component in the resin composition, which is an adhesion inhibiting factor, can be reduced.

In the intermediate layer (2), the above-mentioned elastomer component and the component having an epoxy group are mutually compatible by having a common repetition unit. As the elastomer component and the component having an epoxy group, a combination of styrene-based elastomers or a combination of acrylic-based elastomers is preferable.

The resin composition of the intermediate layer (2) is obtained by mixing the polyethylene-based resin, the elastomer component, and the component having an epoxy group at a specific blending ratio. In the resin composition of the present embodiment, the epoxy group in the component having an epoxy group is compatible with a fluorine component of the fluorine-based resin, and adhesiveness with the fluorine-based resin is excellent. When the resin composition of the present embodiment contains the component having an epoxy group, adhesion with a metal material also becomes possible.

In the intermediate layer (2), by mixing the polyethylene-based resin, the elastomer component, and the component having an epoxy group at a specific blending ratio, a so-called sea-island structure can be formed in which the polyethylene-based resin corresponds to the "sea" and the elastomer component corresponds to the "island". Furthermore, by compatibilizing the component having an epoxy group with the elastomer component, the component having an epoxy group can be uniformly dispersed in the resin composition. Accordingly, the epoxy group is protected with the polyethylene-based resin and the elastomer component, and ring opening of the epoxy group due to moisture is suppressed.

By using a mixed material of the polyethylene-based resin, the elastomer component, and the component having an epoxy group in the first intermediate layer 12, the adhesion between the sealant layer 13 and the substrate layer 11 is improved. For that reason, a laminate 10 that hardly causes interlayer peeling can be provided.

By forming the first intermediate layer 12 using the above-mentioned materials, a packaging bag 31 can be provided in which interlayer peeling is hardly caused at the interface between the substrate layer 11 and the first intermediate layer 12, or the interface between the first intermediate layer 12 and the sealant layer 13. Furthermore, by suppressing the poor adhesion of the first intermediate layer 12, generation of cracking of the packaging bag 31 due to the poor adhesion can be suppressed.

(Sealant Layer)

The sealant layer 13 is used when the laminates are stuck by heat sealing or the like to form a bag shape. The sealant layer 13 faces the space 5 in the packaging bag 31 and is a layer contacting the content 16.

In the present embodiment, the substrate layer 11 includes a layer containing a fluorine-based resin having a high glass transition temperature as a forming material. Accordingly, sticking between the sealant layers 13 using heat sealing or the like can be performed at a high temperature. For that reason, as a material forming the sealant layer 13, a material having a high glass transition temperature can be used.

Furthermore, it is known that as the glass transition temperature of the material forming the sealant layer 13 is higher, the non-adsorbability for the content 16 is more excellent. It is preferable that the sealant layer 13 of the present embodiment contains a cyclic olefin-based resin. When the sealant layer 13 contains the cyclic olefin-based resin, a packaging bag excellent in non-adsorbability for the content 16 can be provided.

Examples of the cyclic olefin-based resin include a cyclic olefin polymer (COP), a cyclic olefin copolymer (COC), and the like. A resin component constituting the sealant layer 13 may be one or two or more kinds of the cyclic olefin-based resins, or may be a mixture of the cyclic olefin-based resin and another resin, an elastomer or the like.

Examples of the cyclic olefin polymer (COP) include a homopolymer of cyclic olefin, a copolymer of two or more kinds of cyclic olefins, and a hydrogenation product of the copolymer. The cyclic olefin polymer is preferably an amorphous polymer, and more preferably a ring opening polymer of cyclic olefin by metathesis or the like, or a hydrogenation product thereof. The cyclic olefin polymer has a high ratio of containing an alicyclic structure as compared with a cyclic olefin copolymer or the like, and is excellent in non-adsorbability for the content 16.

Examples of the cyclic olefin copolymer (COC) include a copolymer of one or two or more kinds of cyclic olefins and one or two or more kinds of non-cyclic olefins, and a hydrogenation product thereof. The cyclic olefin copolymer is preferably an amorphous polymer, and more preferably a copolymer of cyclic olefin and ethylene, or a hydrogenation product thereof.

The cyclic olefin used as a constituent monomer of the cyclic olefin-based resin is an unsaturated hydrocarbon (olefin) having at least one ring structure. Examples thereof include a vinylcycloalkane having a cycloalkane having 3 to 20 carbon atoms and a derivative thereof, a monocycloalkene having 3 to 20 carbon atoms and a derivative thereof, cyclic olefin having a norbornene skeleton (norbornene-based monomer), and the like.

Examples of the norbornene-based monomer include bicyclo[2.2.1]-2-heptene (norbornene) and a derivative thereof. Examples of the derivative include a compound having a substituent such as an alkyl group, a compound having two or more unsaturated bonds like norbornadiene, and a compound having three or more ring structures, two of which constitute a norbornene skeleton. Examples of the norbornene-based monomer having three or more ring structures include tricyclo[5.2.1.02, 6]decene (dihydrodicyclopentadiene), a compound in which one or more molecules of cyclopentadiene are added to norbornene or dihydrodicyclopentadiene by the Diels-Alder reaction (for example, tetracyclododecene, pentacyclopentadecene, hexacycloheptadecene, and the like), and a hydrogenation product, isomer having a different position of a double bond, alkyl substitution body, and the like thereof.

Examples of the non-cyclic olefin used as a constituent monomer of COC include α-olefins such as ethylene, propylene, 1-butene, 1-pentene, 1-hexene, 1-heptene, and 1-octene; and alkenes such as 3-decene and 3-dodecene.

A glass transition temperature of the material forming the sealant layer 13 is preferably 100° C. or higher and 170° C. or lower, and more preferably 105° C. or higher and 160° C. or lower. When the glass transition temperature of the material forming the sealant layer 13 is 100° C. or higher, the sealant layer 13 tends to be excellent in non-adsorbability for the content 16. Further, when the glass transition temperature of the material forming the sealant layer 13 is 170° C. or lower, a high temperature is not required when the laminates 10 are stuck, so that the moldability is excellent.

A thickness of the sealant layer 13 is preferably 20 μm or more, and more preferably 30 μm or more. When the thickness of the sealant layer 13 is 20 μm or more, the sealant layers 13 of the laminates 10 can be stuck by heat sealing or the like to form the laminates 10 into a bag shape. Furthermore, the thickness of the sealant layer 13 is preferably 60 μm or less, and more preferably 50 μm or less. When the thickness of the sealant layer 13 is 60 μm or less, the production cost can be reduced. The upper limit value and the lower limit value in the thickness of the sealant layer 13 can be arbitrarily combined.

It is known that when the sealant layer 13 contains the cyclic olefin-based resin, as the sealant layer 13 becomes thicker, a water vapor permeability of the packaging bag becomes lower. On the other hand, it is known that as the sealant layer 13 becomes thicker, the sealant layer 13 is easily cracked and the falling strength of the packaging bag 31 is lowered. Accordingly, from the viewpoint of lowering the water vapor permeability of the packaging bag, it is preferable that the sealant layer 13 is thicker, but from the viewpoint of increasing the falling strength, it is preferable that the sealant layer 13 is thinner.

In the present embodiment, the substrate layer 11 includes a layer containing a fluorine-based resin having a low water vapor permeability as a forming material. Accordingly, even when the sealant layer 13 is made to be thin as compared with the case where the substrate layer contains a resin other than the fluorine-based resin as a forming material, the water vapor permeability of the packaging bag 31 can be sufficiently lowered. That is, a packaging bag 31 excellent in barrier properties to water vapor can be provided. Furthermore, it is known that as the sealant layer 13 becomes thinner, the sealant layer 13 is more hardly cracked and the falling strength of the packaging bag 31 is increased. For that reason, when the substrate layer includes the layer containing a fluorine-based resin as a forming material, a packaging bag excellent in both barrier properties to water vapor and handleability can be provided.

A lamination configuration of the second joining part 15 at which laminates 10 are joined is in an order of substrate layer 11/first intermediate layer 12/sealant layer 13/sealant layer 13/first intermediate layer 12/substrate layer 11. The second joining part 15 is formed by fusion of resins contained in the sealant layers 13 of the laminates 10.

[Outlet]

An outlet 20 is joined by being held between the opposite sealant layers 13. The outlet 20 preferably contains a cyclic olefin-based resin, and preferably contains a cyclic olefin-based resin at least at a part contacting the content 16. Examples of the cyclic olefin-based resin forming the outlet 20 include those similar to the cyclic olefin-based resin forming the sealant layer 13. A material forming the outlet 20 and a material forming the sealant layer 13 may be the same as or different from each other. In the present embodiment, it is preferable that the outlet 20 and the sealant layer 13 are formed of the same material.

Figure 3:
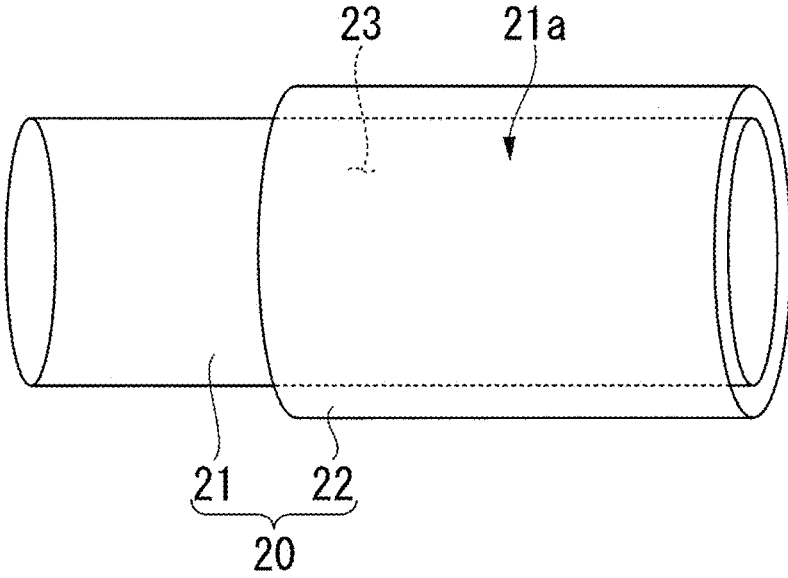
FIG. 3 is a perspective view showing the periphery of an outlet 20.

FIG. 3 is a perspective view showing the periphery of the outlet 20. As shown in FIG. 3, the outlet 20 is a two-colored molded article composed of a first molded body 21 and a second molded body 22.

The first molded body 21 has a cylindrical shape, and has a flow passage 23 for taking out the content 16 in the interior thereof. The first molded body 21 has at least a part accommodated in the space 5. The first molded body 21 contains, as a forming material, preferably a cyclic olefin-based resin or a polyolefin-based resin, and more preferably a cyclic olefin-based resin. When the first molded body 21 is formed of the cyclic olefin-based resin, a packaging bag excellent in non-adsorbability can be provided.

The second molded body 22 has a cylindrical shape, and is formed on an external circumferential surface 21a of the first molded body 21, provided that the second molded body 22 is not formed on the external circumferential surface of the part of the first molded body 21 accommodated in the space 5. The second molded body 22 has a shorter length in an axial direction than the first molded body 21. It is preferable that the second molded body 22 contains a polyolefin-based resin as a forming material.

The polyolefin-based resin may be a homopolymer of one kind of olefin, or may be a copolymer of two or more kinds of olefins. Examples of the olefin include non-cyclic olefins such as ethylene, propylene, 1-butene, 1-hexene, 1-octene, and α-olefin. Specific examples of the polyolefin include polyethylene, polypropylene, an ethylene-α-olefin copolymer, and the like.

These polyolefins may also be a copolymer containing a small amount of a non-olefin-based vinyl monomer such as vinyl acetate, vinyl chloride, and vinyl alcohol. The olefin may be petroleum-derived olefin, plant-derived olefin, or both of petroleum-derived olefin and plant-derived olefin.

The polyolefin-based resin forming the second molded body 22 is preferably a polyethylene-based resin, and more preferably linear low-density polyethylene (LLDPE).

When the second molded body 22 is formed of the polyolefin-based resin, the laminate 10 forming the bag body 17 and the outlet 20 are easily joined, and the handleability and the durability are also excellent.

A laminate configuration of the first joining part 14 at which the laminate 10 and the outlet 20 are joined is in an order of substrate layer 11/first intermediate layer 12/sealant layer 13/outlet 20/sealant layer 13/first intermediate layer 12/substrate layer 11. The first joining part 14 is formed by fusion of the sealant layer 13 of the laminate 10 and a resin contained in the outlet 20.

At the first joining part 14, the laminate 10 may be joined with the first molded body 21 or second molded body 22 of the outlet 20. At the first joining part 14, both of a part at which the laminate 10 and the first molded body 21 are joined and a part at which the laminate 10 and the second molded body 22 are joined may be contained.

[Other Configurations]

The packaging bag 31 may be provided with an accessory such as an inlet, a cock, a label, a knob for opening, and a grip, in addition to the outlet. When the accessory is formed of a resin molded article, a configuration similar to that of the above-mentioned outlet may be adopted.

<Method for Manufacturing Packaging Bag>

A method for manufacturing the packaging bag 31 has a step of forming the laminates 10 and a step of joining the laminates 10 and the outlet 20.

In the step of forming the laminates 10, a resin that is to be a raw material of the substrate layer 11, a resin that is to be a raw material of the first intermediate layer 12, and a resin that is to be a raw material of the sealant layer 13 are simultaneously melted and extrusion-molded, so that the laminates 10 are formed. Furthermore, the laminates 10 can also be formed by laminating the substrate layer 11, the first intermediate layer 12, and the sealant layer 13 by a method such as a dry lamination method or an extrusion lamination method.

In the step of joining the laminates 10 and the outlet 20, first, the outlet 20 is held between the laminates 10 in the state where the sealant layers 13 of the laminates 10 are disposed opposite each other. Then, the laminate 10 and the outlet 20 are jointed to form the first joining part 14. The laminates 10 are joined to form the second joining part 15. Thus, a packaging bag 31 is manufactured.

According to the above-mentioned configuration, there can be provided a packaging bag that has a low water vapor permeability and is excellent in non-adsorbability.

Second Embodiment

<Packaging Bag>

Figure 4:
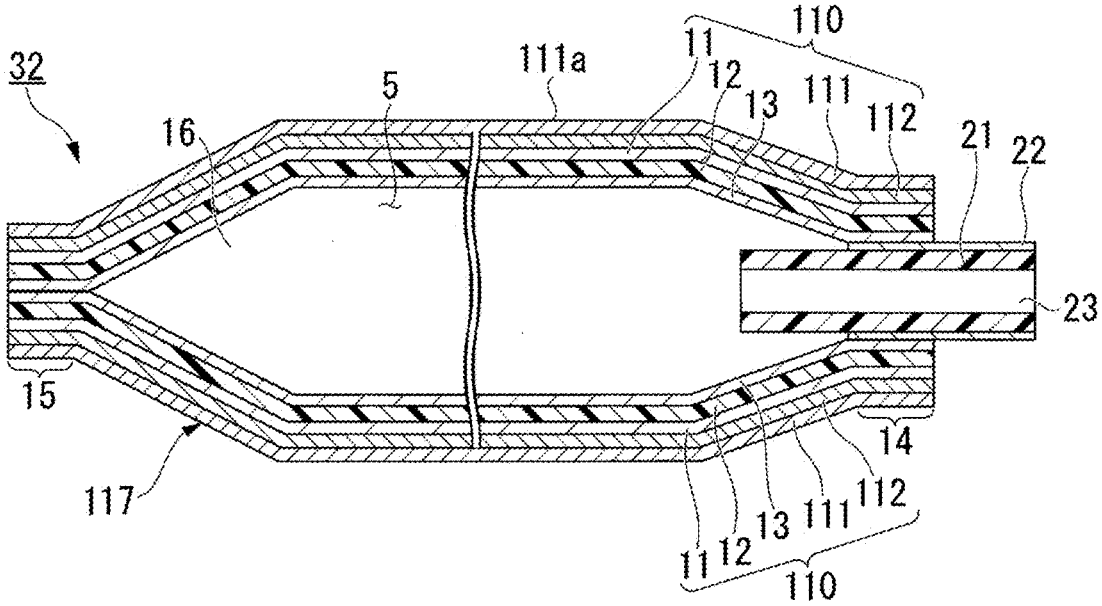
FIG. 4 is a cross-sectional view of a packaging bag 32 according to a second embodiment of the present invention.

A packaging bag according to a second embodiment of the present invention will be described below with reference to FIG. 4. FIG. 4 is a cross-sectional view of the packaging bag according to the second embodiment, and is a view corresponding to FIG. 2. In the present embodiment, the same symbols are given to elements common to those of the first embodiment, and detailed description will be omitted.

As shown in FIG. 4, a packaging bag 32 of the second embodiment has a bag body 117 and an outlet 20 joined to the bag body 117. The bag body 117 includes laminates 110 as a forming material, and is molded into a bag shape by sticking two laminates 110 to each other.

The laminate 110 of the second embodiment has a surface resin layer 111, a second intermediate layer 112, a substrate layer 11, a first intermediate layer 12, and a sealant layer 13 in this order.

The bag body 117 shown in FIG. 4 is such that the two laminates 110 are used, the sealant layers 13 of the laminates are disposed opposite each other, and the sealant layers 13 are stuck to each other.

The second intermediate layer 112 in the second embodiment may contain the same material as the material contained in the first intermediate layer 12. The second intermediate layer 112 may contain the same material as that of the first intermediate layer 12, or may contain a different material.

(Surface Resin Layer)

The surface resin layer 111 in the second embodiment is a layer containing a polyolefin-based resin, a polyethylene-based resin, a polyimide-based resin, a polyester-based resin or the like. Inter alia, the surface resin layer 111 preferably contains a polyolefin-based resin, and more preferably is composed of a polyolefin-based resin containing a cyclic olefin-based resin.

The cyclic olefin-based resin may be the same material as the material contained in the sealant layer 13. The surface resin layer 111 may be the same material as that of the sealant layer 13, or may be a different material.

The surface resin layer 111 may have a monolayer configuration of one layer, or may have a laminate configuration of two or more layers. For example, a printing layer or a colored resin layer may be provided on a surface 111*a* of the surface resin layer 111 opposite to the second intermediate layer 112.

According to the above-mentioned configuration, as in the first embodiment, a packaging bag that has a low water vapor permeability and is excellent in non-adsorbability can be provided. In the second embodiment, by arbitrarily selecting a resin for the surface resin layer 111, the printability of a surface of the packaging bag 32 can be improved and the slipperiness can be improved.

Furthermore, since the laminate 110 used in the second embodiment has a five-layer configuration, the strength of the packaging bag 32 is high as compared with the first embodiment. Furthermore, in the second embodiment, curling of the laminate 110 can be suppressed as compared with the first embodiment. Particularly, by forming the first intermediate layer 12 and the second intermediate layer 112 with the same material, a surface on the internal side of the substrate layer 11 and a surface on the external side of the substrate layer 11 have the same nature, and curling of the laminate 110 can be further suppressed. As a result of suppression of the curling of the laminate 110, processing of the laminate 110 becomes easy in the step of manufacturing the packaging bag 32.

Examples of the preferable embodiments according to the present invention have been described above with reference to the attached drawings, and it goes without saying that the present invention is not limited to such examples. Various shapes, combinations, and the like of respective constituent members shown in the above-mentioned examples are one example, and can be variously changed based on design requirement and the like in a range not departing from the gist of the present invention.

EXAMPLES

The present invention will be described below by way of Examples, but the present invention is not limited by these Examples.

Examples 1 to 13, Comparative Example 1

Laminates of a three-layer configuration each having a substrate layer, an intermediate layer, and a sealant layer in this order were manufactured. Resins that were to be raw materials of respective layers shown in Table 1, which had each been heated and melted separately, were subjected to a multilayer film formation using an extruder capable of performing co-extrusion multilayer molding, and laminates of a three-layer configuration were obtained.

Separately, laminates of a five-layer configuration having a surface resin layer, a second intermediate layer, a substrate layer, a first intermediate layer, and a sealant layer in this order were manufactured. Resins that were to be raw materials of respective layers shown in Table 2 were used, and film formation was performed as in the laminate of a three-layer configuration, so that laminates of a five-layer configuration were obtained. Here, in Table 1 and Table 2, a numerical value in parenthesis is the thickness of each layer.

Furthermore, apart from these laminates, cylindrical outlets each including a cyclic olefin polymer (COP) on the internal side and polyethylene (PE) on a part of the external side were molded by a two-color molding method.

The outlet was held between the laminates, and a first joining part between the laminate and the outlet, and a second joining part between laminates 10 were joined to manufacture a packaging bag.

TABLE 1

| | | Laminate | | Outlet | |
|---|---|---|---|---|---|
| | | | | First | Second |
| | Sealant layer | First intermediate layer | Substrate layer | molded body | molded body |
| Example 1 | COP [30 µm] | Intermediate layer 1 [20 µm] | PCTFE [30 µm] | COP | PE |
| Example 2 | COP [30 µm] | Intermediate layer 1 [20 µm] | PCTFE/ Coating layer [30 µm/3 µm] | COP | PE |
| Example 3 | COP [30 µm] | Intermediate layer 1 [20 µm] | PCTFE [30 µm] | COP | COP |
| Example 4 | PE [30 µm] | Intermediate layer 1 [20 µm] | PCTFE [30 µm] | PE | PE |
| Example 5 | COP [30 µm] | Intermediate layer 2 [20 µm] | PCTFE [30 µm] | COP | PE |
| Example 6 | COP [30 µm] | Intermediate layer 3 [20 µm] | PCTFE [30 µm] | COP | PE |
| Example 7 | COP [30 µm] | Intermediate layer 1 [20 µm] | MAH-ETFE [30 µm] | COP | PE |
| Example 8 | COP [30 µm] | Intermediate layer 1 [20 µm] | PCTFE [60 µm] | COP | PE |

TABLE 1-continued

| | Laminate | | | Outlet | |
| | | | | First molded body | Second molded body |
| --- | Sealant layer | First intermediate layer | Substrate layer | First molded body | Second molded body |
| Example 9 | COP [30 μm] | Intermediate layer 1 [20 μm] | PCTFE [180 μm] | COP | PE |
| Comparative Example 1 | COP [30 μm] | Intermediate layer 4 [20 μm] | PCTFE [30 μm] | COP | PE |

TABLE 2

| | Laminate | | | | | Outlet | |
| | Sealant layer | First intermediate layer | Substrate layer | Second intermediate layer | Surface resin layer | First molded body | Second molded body |
| --- | --- | --- | --- | --- | --- | --- | --- |
| Example 10 | COP [30 μm] | Intermediate layer 1 [20 μm] | PCTFE [30 μm] | Intermediate layer 1 [20 μm] | COP [30 μm] | COP | PE |
| Example 11 | COP [30 μm] | Intermediate layer 2 [20 μm] | PCTFE [60 μm] | Intermediate layer 2 [20 μm] | COP [30 μm] | COP | PE |
| Example 12 | COP [30 μm] | Intermediate layer 1 [20 μm] | PCTFE [100 μm] | Intermediate layer 1 [20 μm] | COP [30 μm] | COP | PE |
| Example 13 | COP [30 μm] | Intermediate layer 1 [20 μm] | PCTFE [180 μm] | Intermediate layer 1 [20 μm] | COP [30 μm] | COP | PE |

In addition, as raw materials of the substrate layer, the sealant layer, and the surface resin layer, the following materials were used:

COP: Cyclic olefin polymer. ZEONOR (registered trademark) 1020R manufactured by ZEON CORPORATION was used.

PE: Linear low-density polyethylene. Nipolon (ρ=0.930 g/cm³, for internal layer) manufactured by TOSOH CORPORATION was used.

PCTFE: Polychlorotrifluoroethylene resin. DF0050-C1 manufactured by DAIKIN INDUSTRIES, LTD. was used.

MAH-ETFE: Fluorine-based resin. Fluon LH-8000 (ρ=1.75 g/cm³, Tm=180° C., melt mass flow rate=4 g/10 minutes (test temperature 230° C., load 2.16 kgf)) manufactured by Asahi Glass Co., Ltd. was used.

Table 3 shows the compositions of intermediate layers 1 to 4. In addition, in Table 3, a ratio of each material is a ratio by mass (%).

TABLE 3

| Intermediate layer 1 | Linear low-density polyethylene (LLDPE)/ Maleic anhydride-modified polyethylene (ADMER) = 50/50 |
| --- | --- |
| Intermediate layer 2 | Polyethylene (PE)/Elastomer/Epoxidized polybutadiene = 70/30/1 |
| Intermediate layer 3 | Linear low-density polyethylene (LLDPE)/ Maleic anhydride-modified polyethylene (ADMER) = 70/30 |
| Intermediate layer 4 | Maleic anhydride-modified polyethylene |

As materials in Table 3, the following commercial products were used:

Elastomer: Kraton G1657M (styrene content 13% by mass, ρ=0.90 g/cm³, melt mass flow rate=22 g/10 minutes (test temperature 230° C., load 5 kgf) manufactured by KRATON CORPORATION was used.

Epoxidized polybutadiene: Epoxidized 1,2-polybutadiene (ρ=0.99 g/cm³, Mn=1,000) manufactured by ADEKA CORPORATION was used.

<Assessment>

Concerning respective packaging bags of Examples 1 to 13 and Comparative Example 1, the following respective tests were performed. The results of the respective tests are shown in Table 4.

[Deterioration of Content]

As a content, 100 mL of a 0.05% by mass nitroglycerin injection solution was filled into each of the packaging bags of Examples and Comparative Example. By subjecting these obtained products to high pressure steam sterilization for 40 minutes under conditions of 110° C. and 0.106 MPa, packaging bags containing the content were obtained. The above-mentioned packaging bags each containing the content were stored at 40° C. for 3 months, and the content amount of the nitroglycerin injection solution was confirmed visually.

○: The content amount of the content was 95% or more of the filling amount.

Δ: The content amount of the content was 80% or more of the filling amount.

×: The content amount of the content was less than 80% of the filling amount.

[Falling Strength]

One hundred packaging bags of Examples and one hundred packaging bags of Comparative Example were prepared, and a falling test was performed under the following conditions:

Ambient temperature: 20° C.

Falling height: 2.0 m

Based on the above-mentioned test results, assessment was made under the following criteria:

⊙: There was no broken packaging bag.
○: There was one broken packaging bag.
Δ: There were two broken packaging bags.
×: There were three or more broken packaging bags.

TABLE 4

|  | Deterioration of content | Falling strength |
| --- | --- | --- |
| Example 1 | ○ | ⊙ |
| Example 2 | ○ | ○ |
| Example 3 | ○ | ⊙ |
| Example 4 | Δ | ⊙ |
| Example 5 | ○ | ○ |
| Example 6 | ○ | ○ |
| Example 7 | ○ | Δ |
| Example 8 | ○ | ⊙ |
| Example 9 | ○ | ⊙ |
| Example 10 | ○ | ○ |
| Example 11 | ○ | ○ |
| Example 12 | ○ | ○ |
| Example 13 | ○ | ○ |
| Comparative Example 1 | Δ | X |

As shown in Table 4, the packaging bags of Examples 1 to 13, to which the present invention had been applied, could suppress the deterioration of the content. From this result, it is considered that in the packaging bags of Examples 1 to 13, adsorption of the content is suppressed. Furthermore, the packaging bags of Examples 1 to 9 were also excellent in falling strength. On the other hand, in the packaging bag of Comparative Example 1, the deterioration of the content was confirmed. It is considered that this is due to defective adhesion of the intermediate layer in the packaging bag of Comparative Example 1. Furthermore, the packaging bag of Comparative Example 1 was also inferior in falling strength.

What is claimed is:

1. A packaging bag comprising:
a bag body; and
an outlet joined to said bag body,
wherein
said bag body includes, as a forming material, two laminates each having at least a substrate layer, a first intermediate layer, and a sealant layer in this order, and has a bag shape formed by sticking said sealant layers to each other, said sealant layers being disposed opposite each other to define an internal side,
said outlet is joined by being held between said opposite sealant layers,
said packaging bag has a first joining part at which each of said two laminates and said outlet are joined and a second joining part at which said two laminates are joined to each other,
said first intermediate layer contains a polyethylene-based resin and a modified polyethylene-based resin,
said substrate layer includes a layer containing-polychlorotrifluoroethylene as a forming material,
said sealant layer contains a cyclic olefin polymer, wherein a glass transition temperature of the cyclic olefin polymer is 100° C. or higher and 170° C. or lower,
said sealant layer is a layer facing an interior space of the packaging bag and contacting a content,
said outlet is a molded article consisting of a first molded body and a second molded body, wherein
said first molded body consists of a cylindrical shape and has a flow passage for taking out the content in an interior thereof, and further has at least a part accommodated in the interior space of the packaging bag, wherein one end of said first molded body is disposed in the interior of the packaging bag and the other end of said first molded body is disposed outside the packaging bag,
said second molded body consists of a cylindrical shape, is formed on an external circumferential surface of said first molded body, and has a shorter length in an axial direction than said first molded body, and is not formed on the external circumferential surface of the part of said first molded body accommodated in the interior space,
said first molded body consists of a cyclic olefin-based resin as a forming material,
said second molded body consists of linear low-density polyethylene as a forming material,
each of said two laminates forming said bag body is joined with said second molded body of said outlet, and
said first joining part is formed by fusion of said sealant layer of each of said two laminates and said second molded body of said outlet.

2. The packaging bag according to claim 1, wherein said polyethylene-based resin is linear low-density polyethylene.

3. The packaging bag according to claim 1, wherein said modified polyethylene-based resin is maleic anhydride-modified polyethylene.

4. The packaging bag according to claim 1, comprising:
a surface resin layer; and
a second intermediate layer held between said substrate layer and said surface resin layer, on a surface on an external side of said substrate layer.

5. The packaging bag according to claim 1, wherein said sealant layer of each of said two laminates is in direct contact with said second molded body of said outlet.

6. A packaging bag comprising:
a bag body; and
an outlet joined to said bag body,
wherein
said bag body includes, as a forming material, two laminates each having at least a substrate layer, a first intermediate layer, and a sealant layer in this order, and has a bag shape formed by sticking said sealant layers to each other, said sealant layers being disposed opposite each other to define an internal side,
said outlet is joined by being held between said opposite sealant layers,
said packaging bag has a first joining part at which each of said two laminates and said outlet are joined and a second joining part at which said two laminates are joined to each other,
said first intermediate layer contains a polyethylene-based resin, an elastomer component, and a component having an epoxy group,
said substrate layer includes a layer containing polychlorotrifluoroethylene as a forming material,
said sealant layer contains a cyclic olefin polymer, wherein a glass transition temperature of the cyclic olefin polymer is 100° C. or higher and 170° C. or lower,
said sealant layer is a layer facing an interior space of the packaging bag and contacting a content,
said outlet is a molded article consisting of a first molded body and a second molded body, wherein said first molded body consists of a cylindrical shape and comprises a flow passage for taking out the content in an interior thereof, and further has at least a part accommodated in the interior space of the packaging bag, wherein one end of said first molded body is disposed in the interior of the packaging bag and the other end of said first molded body is disposed outside the packaging bag, said second molded body consists of a cylindrical shape, is formed on an external circumferential surface of said first molded body, and has a shorter length in an axial direction than said first molded body, and is not formed on the external circumferential surface of the part of said first molded body accommodated in the interior space, said first molded body consists of a cyclic olefin-based resin as a forming material, said second molded body consists of linear low-density polyethylene as a forming material, each of said two laminates forming said bag body is joined with said second molded body of said outlet, and said first joining part is formed by fusion of said sealant layer of each of said two laminates and said second molded body of said outlet.

7. The packaging bag according to claim 6, wherein said component having an epoxy group is a component in which epoxy has been introduced into 1,2-polybutadiene and has a number average molecular weight of 500 or more and 4,000 or less.

8. The packaging bag according to claim 6, wherein said elastomer component contains a styrene-ethylene-butylene-styrene copolymer having a styrene content of 8% by mass or more and 24% by mass or less.

9. The packaging bag according to claim 1, wherein a thickness of said layer containing polychlorotrifluoroethylene as a forming material is 20 μm or more and 60 μm or less.

10. The packaging bag according to claim 6, wherein said sealant layer of each of said two laminates is in direct contact with said second molded body of said outlet.

* * * * *